United States Patent
Torok

[15] 3,650,886
[45] Mar. 21, 1972

[54] FORMATION OF COLLOIDAL SUSPENSIONS OF CHRYSOTILE ASBESTOS BY TREATMENT WITH HYDROGEN SMECTITES

[72] Inventor: Andrew Torok, Parsippany, N.J.

[73] Assignee: Yara Engineering Corporation, Elizabeth, N.J.

[22] Filed: Feb. 26, 1970

[21] Appl. No.: 14,655

[52] U.S. Cl. ............................ 162/3, 106/99, 162/3, 252/313
[51] Int. Cl. ........................................... C03b 37/00
[58] Field of Search ............... 162/3, 153, 154; 106/99; 252/313

[56] References Cited

UNITED STATES PATENTS

| 3,297,516 | 1/1967 | Naumann et al. | 162/153 X |
| 3,170,834 | 2/1965 | Oesterheld | 162/3 |
| 2,586,726 | 2/1952 | Schuetz et al. | 162/154 X |
| 3,014,835 | 12/1961 | Feigley et al. | 162/154 |
| 3,334,010 | 8/1967 | Moore | 162/154 |

Primary Examiner—S. Leon Bashore
Assistant Examiner—Alfred D'Andrea, Jr.
Attorney—Angelo M. Pisarra

[57] ABSTRACT

A method for preparing a colloidal suspension wherein an aqueous slurry of water, chrysotile asbestos, and hydrogen smectite is subjected to a shearing action until the slurry is a colloidal suspension of hydrogen smectite and asbestos, the ultimate particle size of at least 90% of the chrysotile asbestos having a length of no greater than 3 microns and a diameter no greater than 0.05 microns. The ph of the slurry is no greater than 5. The ratio by weight of the hydrogen smectite to the chrysotile asbestos ranges from about 1–30 to about 30–1. The ratio by weight of the water to the combined weights of the chrysotile asbestos and the hydrogen smectite ranges from about 100–1 to about 100–10. The hydrogen smectite is selected from hydrogen montmorillonite, hydrogen hectorite, or mixtures thereof.

14 Claims, No Drawings

FORMATION OF COLLOIDAL SUSPENSIONS OF CHRYSOTILE ASBESTOS BY TREATMENT WITH HYDROGEN SMECTITES

BACKGROUND OF THE INVENTION

Prior to this invention others stated that they had produced colloidal chrysotile asbestos by mixing therewith positively charged hydrous oxides of certain metals as described in U.S. Pat. No. 2,661,288, or using a metal aluminate together with a monobasic acid as described in U.S. Pat. No. 3,297,516, or using surface active agents as described in U.S. Pat. No. 2,626,213.

SUMMARY OF THE INVENTION

According to this invention aqueous slurries of certain hydrogen smectites and chrysotile asbestos are subjected to shearing action to produce aqueous systems which are novel and contain novel solid compositions of the present invention.

The smectite starting materials used in the practice of this invention are slakeable montmorillonite and/or slakeable hectorite. The montmorillonite and hectorite are respectively of two main classifications, namely, those whose exchangeable cations are mainly sodium and are respectively known to those skilled in the art as sodium montmorillonite and sodium hectorite and those whose exchangeable cations are mainly calcium and/or magnesium are respectively known to those skilled in the art as alkaline earth montmorillonite and alkaline earth hectorite.

The chrysolite asbestos starting materials used may be either raw or refined and may be of long and/or short fiber. It is preferable to use the refined chrysotile asbestos which is produced by removing the non-fibrous contaminants such as non-fibrous quartz, calcite and feldspar which may be present in the raw or naturally occurring material. The refined chrysotile asbestos which is preferably used consists of fibers which have been mechanically loosened or separated from each other in the bundles in which they naturally occur. These fibers may be long or short fibers and if desired they may be reduced in length although this is not necessary in the practice of this invention.

According to this invention novel aqueous suspensions are produced by subjecting to shearing action in a high speed shear mixer a slurry produced by combining water, chrysotile asbestos, smectite selected from the group consisting of montmorillonite and/or hectorite and sufficient acid so that the pH of said slurry is no greater than 5, preferably no greater than 4 AND more preferably no greater than 3 and of no lower limit except economy and for that reason is generally no greater than 1. The ratio by weight of the smectite to the chrysotile asbestos is in the range of about 1–30 to about 30–1 and preferably about 1–10 to about 10–1 and more preferably 1–4 to about 4–1; and the ratio by weight of the water to the combined weights of the smectite and chrysotile asbestos is in the range of about 100 parts of water to about 1–10 and preferably about 2–5 parts of the combined weights of the smectite and chrysotile asbestos. The acid employed may be organic and/or inorganic and the quantity used is dependent upon the acid used and the pH desired. Examples of some of them are formic, acetic, propionic, hydroxy acetic, hydrochloric, sulfuric and phosphoric acids. The shearing action is continued and the desired pH is maintained by adding more acid when required at least until a suspension is produced and has a stabilized pH of the desired value, and with the ultimate particle size of at least 90 percent of the chrysotile asbestos which are colloidal and have a maximum or lengthwise dimension no greater than 3 microns and a diameter no greater than 0.05 micron. When this procedure is employed, the components used in the production of the slurry may be combined in any order desired. For example, the water, smectite and chrysotile asbestos may be mixed together to form a slurry and then sufficient quantity of an acid may be added thereto to provide a slurry having the desired pH. Due to the increase of pH generally encountered during the early shearing and sometimes thereafter, additional acid is added from time to time to lower the pH thereof to the desired value for further shearing so that the desired pH is maintained. By this procedure hydrogen smectite is produced in situ due to exchangeable cations of the smectite employed being replaced by hydrogen and with or without the presence of appreciable amounts of excess acid and with the formation of the salt or salts of the replaced cations and the anions of the acid employed.

The novel aqueous suspensions are produced by subjecting to shearing action in a high speed shear mixer a slurry whose pH is no greater than 5, preferably no greater than 4, and preferably no greater than 3, and comprising water, chrysotile asbestos and hydrogen smectite with or without the addition of acid or the presence of excess acid. The hydrogen smectite used is hydrogen montmorillonite and/or hydrogen hectorite. The ratio by weight of the hydrogen smectite to the asbestos is in the range of about 1–30 to about 30–1 and preferably about 1–10 to 10–1 and more preferably about 1–4 to about 4–1; and the amount of water is about 100 parts by weight to about 1–10 and preferably about 2–5 parts of the combined weights of the hydrogen smectite and asbestos used. The shearing is continued at least until a colloidal suspension is produced, with the ultimate particle size of at least 90 percent of the asbestos particles are colloidal and have a maximum or lengthwise dimension no greater than 3 microns and a diameter no greater than 0.05 micron. This method is within the general procedure before described, but in addition in some cases do not require the use of acid addition to the slurry. For example, the hydrogen smectite may be separately prepared by passing the smectite through a hydrogen ion exchange column and recovering hydrogen smectite which in some cases itself endows and maintains the slurry under the desired chosen pH conditions. However, in those instances where the pH conditions of the slurry are not maintained throughout the shearing action, acid is added to the slurry as to maintain the slurry at the desired pH conditions chosen.

Also all of the suspension may be treated as by filtration or centrifugation and generally heat or any other suitable methods to remove most of the water therefrom thereby to provide solid compositions of matter whose water content measures less than 15 percent by weight thereof. Also if desired, these compositions may be rendered substantially free of acid and water-soluble salts when present by water washing and then drying. These solid compositions recovered from said suspensions may be in the form of a cake or fine powder and preferably the latter, and comprise the smectite and asbestos originally used and modified by the combined shearing action and the pH conditions described.

These novel solid compositions of matter, which may or may not be acid and/or salt free, may be used to provide excellent dispersions thereof in either water or other polar liquids such as glycerine and some to provide excellent dispersions in both water and other polar liquids some to provide excellent dispersions in combinations of water and other polar liquids.

All of the aqueous suspensions of the present invention, examples of which are produced by the methods defined in all of the foregoing examples are useful when added to ceramic clay bodies to increase the green strength and plasticity thereof. The aqueous suspensions are also useful as components for water base paints and other industrial applications where the smectite themselves have been used. Also 1–5 percent aqueous dispersions of the novel solid compositions of matter are useful for the same purpose. The novel solid compositions of matter find further utility as thickeners for water to provide aqueous gels useful in the aforesaid fields.

The novel solid compositions of matter are also useful as thickeners when dispersed in polar liquids, such as monohydric and polyhydric alcohols, ketones and esters, some examples of which are methyl, ethyl, propyl and octyl alcohols, glycerine, diethylene glycol, acetone, methyl ethyl ketone, ethyl acetate and polyesters. For example, they are useful for thickening uncured polyesters, to control the viscosity or flow thereof and the presence of said solid compositions in such combinations after curing serve as reenforcing agents.

It is my belief that by following the general procedures before described, the asbestos particles in the resulting suspensions and in the solid composition of matter which is anhydrous or contains water measuring less than 15 percent by weight thereof have hydrogen smectite employed coupled therewith or bound thereto physically and/or chemically by absorption but more probably by adsorption or chemical bonding by reaction or chemi-sorption. The amount of the hydrogen smectite coupled with or bound to the asbestos particles depends upon the ratio of the hydrogen smectite and asbestos used. I further believe that when the ratio by weight of hydrogen smectite to the asbestos is 1–30, most of the hydrogen smectite is bound to the asbestos particles but when the ratio of the hydrogen smectite to the asbestos is 30–1, only a small proportion of the hydrogen smectite is bound to the asbestos, and in general only approximately 1 part by weight of the hydrogen montmorillonite is bound to 1 part by weight of the asbestos.

The terms "montmorillonite" and "hectorite" as employed throughout the present description and claims, are used in their generic sense. It is known that a naturally occurring montmorillonite from one deposit may vary from that of another deposit in the number of milliequivalents of exchangeable cations per 100 grams thereof and/or also as to the specific exchangeable cations mainly therein, and in all cases are characterized as being an expanding lattice dioctahedral clay-mineral.

It is also known that a naturally occurring hectorite from one deposit may vary from that of another deposit in the number of milliequivalents of exchangeable cations per 100 grams thereof and/or also as to the specific exchangeable cations mainly therein; and in all cases are characterized as being an expanding lattice trioctahedral clay-mineral.

The milliequivalents of exchangeable cations per 100 grams of the species of montmorillonite and hectorite used in the specific examples hereinafter set forth were in the range of 80–100. All other species thereof whose cation exchange capacities are outside that range may also be used in the practice of this invention. Also in all cases the montmorillonite and hectorite used as starting materials in the practice of this invention are slakeable.

DESCRIPTION OF THE PREFERRED EMBODIMENTS

The following examples are given by way of illustrating the present invention, and are to be regarded as illustrative and not by way of limitation, all parts and percentages being by weight unless otherwise specified.

EXAMPLE 1

A suspension of slakeable sodium montmorillonite (refined Wyoming bentonite which has been rendered slakeable in a conventional manner) in water was prepared by subjecting 2 grams of the montmorillonite and 100 grams of water to the action of a Cowles High Shear Mixer for a period of 1 hour. Then 1 gram of chrysotile asbestos fibers were added to the suspension in said mixer while continuing the operation of the mixer. The operation of the mixer was continued for 10 minutes after the chrysotile asbestos had been added. The resultant slurry at the end of the 10 minute period had a fibrous pulp appearance. At the end of the 10 minute period, the operation of the mixer was still maintained while there was added to the slurry over a 1 hour period sufficient sulphuric acid (60° Baume) to first reduce and then maintain the pH of the slurry at 3.0 over the 1 hour period. At the end of the 1 hour period, the operation of the mixer was discontinued and the resultant slurry in the mixer was a smooth colloidal suspension and had a stabilized pH approximately the same as the initial pH. The resultant slurry was filtered whereby the solids were separated from the aqueous phase and recovered in the form of a filter cake. Excess acid and water-soluble salts were removed from said solids (filter cake) by redispersing the solids in water measuring about 100 times the weight of the solids, and filtering the redispersion to remove and recover solids from the aqueous phase. The steps of redispersing and filtering as before described are used 1–3 more times to obtain solids which are substantially free of acid and water-soluble-salt. At the end of the final filtration step, the so purified filter cake solids was dried at about 100° C. and then pulverized. The appearance of the final pulverized product, known as Product 1, was a fine powder. This pulverizing step reduces the individual agglomerates to particles approaching the ultimate particle size without any appreciable fracturing or breaking of particles of ultimate particle size.

EXAMPLE 2

The same procedure and components and amounts thereof as described in Example 1 were used except that in place of the sulfuric acid glacial sufficient acetic acid was used to reduce and maintain the pH of the slurry at 4.0 over the 1 hour period. The final product after the pulverizing step, known as Product 2, was also a fine powder.

EXAMPLE 3

The same procedure and components as described in Example 2 were used except that instead of 2 only 1 gram of the sodium montmorillonite, 300 grams instead of 100 grams of water and 10 grams instead of 1 gram of chrysotile asbestos fibers were used and sufficient glacial acetic acid was so used to reduce and maintain the pH of the slurry over the 1 hour period at 3.5 instead of 4.0. The final product after the pulverizing step, known as Product 3, was a fine powder.

EXAMPLE 4

The same procedure and components and amounts thereof as described in Example 3 were used except that instead of 2 grams of the sodium montmorillonite only 1 gram was used and 20 grams instead of 10 grams of chrysotile asbestos were used. The final product after the pulverizing step, known as Product 4, also was a fine powder.

EXAMPLE 5

The same procedure and components and amounts thereof as described in Example 4 were used except that instead of the glacial acetic acid used to reduce and maintain the pH of the slurry at about 3.5 over the 1 hour period, hydrochloric acid was substituted therefor to reduce and maintain the pH of the slurry at 2.0 over that 1 hour period. The final product after the pulverizing step, known as Product 5, was also a fine powder.

EXAMPLE 6

The same procedure, components and amounts of the components described in Example 1 were used except that 10 grams instead of 2 grams of the sodium montmorillonite were used and instead of the sulfuric acid, sufficient glacial acetic acid was so used to reduce and maintain the pH of the slurry at 4.0 over the 1 hour period. The final product, after the pulverizing step, known as Product 6, was also a fine powder.

EXAMPLE 7

The same procedure and components as those of Example 1 were used except that instead of 2 grams of sodium montmorillonite, only 1 gram thereof was used and instead of the sulfuric acid, sufficient phosphoric acid was so used to reduce and maintain the pH of the slurry at 2.0 over the 1 hour period. The final product after the pulverizing step, known as Product 7, was also a fine powder.

EXAMPLE 8

The same procedure and components as described in Example 1 were used except that in place of the sodium montmorillonite 2 grams of naturally occurring alkaline earth montmorillonite which was rendered slakeable were used. The alkaline earth montmorillonite in this instance contained exchangeable calcium and magnesium cations measuring about 80 percent of the total exchangeable cations thereof, with practically all of the remaining 20 percent being sodium.

The appearance of the final pulverized product, known as Product 8, was a fine powder.

EXAMPLE 9

The same procedure, components and amounts of components as described in Example 1 were used, except that 2 grams of slakeable sodium hectorite was used instead of the 2 grams of sodium montmorillonite. The final product after the pulverizing step, known as Product 9, was also a fine powder.

EXAMPLE 10

Two grams of the same type of montmorillonite of Example 1, namely slakeable sodium montmorillonite were dispersed in 50 grams of water. This suspension was passed through a column containing "Amberlite IR-120 (Rohn & Haas)" hydrogen cation exchange resin the resulting suspension was recovered. Due to this treatment hydrogen ions replaced exchangeable cations of the montmorillonite so that the suspension now contained hydrogen montmorillonite and had a pH of 1.0.

One gram of chrysotile asbestos was slurried in 50 grams of water to form a fibrous pulp suspension. The asbestos suspension was then added to the hydrogen montmorillonite suspension. This mixture which had a fibrous appearance was then subjected to the action of a Cowles high shear mixer for a period of 1 hour. At the end of that time the resultant mass no longer had the fibrous appearance of the original mixture but was a colloidal dispersion in the form of a colloidal gel. The pH of this gel was stable at 4.0. The gel was filtered to separate the water from the solid matter which was dried at 110° C. and the dried filter cake was then pulverized and is known as Product 10.

In the procedures described in Examples 1–9 the pH of the slurry was first reduced to the value stated and if after being subjected to the action of the high shear mixer, the pH of the mass was measured and when it was found to have drifted to a value materially above the original value more acid was added to bring the mass back to original value. This procedure was continued until the final suspension was produced having a pH of the initial value which did not change but was stabilized even after being subjected to the action of the high speed mixer for an additional half hour and that is one of the procedures that was followed to maintain the pH as described.

The terms "smectite," "montmorillonite" and "hectorite" used in the present description and claims unless defined as naturally occurring means those respective materials which are slakeable.

The chrysotile asbestos used in each of the foregoing examples is a commercially available product known on the market as "Johns-Manville-Paperbestos No. 5" whose surface is 2,2000 square centimeters per gram; cruddy content zero; and +6 mesh 0 percent; +10 mesh 8 percent; +14 mesh 25 percent; +20 mesh 33 percent; +35 mesh 27 percent; +65 mesh 2 percent; −65 mesh 5 percent.

Other chrysotile asbestos of either longer or shorter fiber and either smaller or greater surface area per gram may be used in the practice of this invention.

According to this invention, as exemplified in Examples b 1–10, the solid compositions recovered from the aqueous suspensions are all characterized by having a moisture content less than 15 percent by weight thereof and comprise the smectite and asbestos originally used and modified by the shearing action on said slurries under the pH conditions defined.

Properties of each of the Products 1–10 were evaluated by making a 1 percent dispersion thereof in both water and glycerine and the results were recorded and are set forth in the following table. For this purpose 1 gram of the product to be tested was added to 99 grams of water in a Waring blender and 1 gram of the same product was added to 99 grams of glycerine in another Waring blender. Both blenders were brought into operation and so maintained for 15 minutes after which the character of the resulting 1 percent dispersions were ascertained and noted and appear in the following table. The Viscosities were measured in centipoises- Brookfield Viscosity 50 r.p.m., 25° C. The product number is given and under "water" and "glycerine" the viscosities of the 1 percent dispersions of the individual products in water and glycerine respectively are shown. Under "Comments," the character of the dispersions in water and glycerine are recorded.

| Product No. | Viscosity—1% suspension | | Comments |
|---|---|---|---|
| | Glycerine | Water | |
| 1 | 1,480 | 72 | Flocced dispersion in glycerine, excellent dispersion in water. |
| 2 | 1,740 | 76 | Do. |
| 3 | 7,080 | 348 | Excellent dispersion in glycerine, flocced dispersion in water. |
| 4 | 10,400 | 568 | Do. |
| 5 | 6,700 | 412 | Do. |
| 6 | 980 | 24 | Flocced dispersion in glycerine. excellent dispersion in water. |
| 7 | 3,560 | 340 | Excellent dispersion in glycerine, excellent dispersion in water. |
| 8 | 1,680 | 76 | Flocced dispersion in glycerine excellent dispersion in water. |
| 9 | 4,020 | 260 | Excellent dispersion in glycerine excellent dispersion in water. |
| 10 | 1,260 | 120 | Flocced dispersion in glycerine excellent dispersion in water. |

Products 3, 4, 5, 7 and 9 served as excellent thickeners when dispersed in low viscosity polyester, "Marco MR-28V Resin" which is a rigid type styrene type polyester resin of Marco Chemical Corp. Four parts by weight of each of said five products were respectively dispersed in five separate quantities of said resin, each measuring 96 parts by weight. In each of the five cases the liquid resin was thereby thickened to the consistency of a soft putty which could be spread with a spatula and showed no flow on a vertically disposed surface after 1 hour.

Products 7, 9 and 10 serve as excellent thickeners for aqueous systems, such as water base latex paints.

Products 1, 2, 6 and 8 are excellent suspending agents for aqueous dispersions of pigments in the fields of ceramics, paints, etc.

Additional novel compositions of this invention are those produced by subjecting to the action of a mixer, such as a Waring blender for 15 minutes or more a mixture in the proportions of 1–5 grams of all of the respective solid compositions of the present invention recovered from their aqueous suspensions and 99–95 grams respectively of water and organic polar liquids, examples of which have been heretofore set forth. These additional novel compositions of matter are dispersions which find use in the respective field in water base paints and other aqueous systems in which the smectite themselves have been used and in organic systems to provide colloidal reenforcing and/or thickening agents therein.

Since certain changes in carrying out the above processes and certain modifications in the compositions which embody the invention may be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention which as a matter of language might be said to fall

I claim:

1. A method for preparing a colloidal asbestos suspension comprising:

subjecting to shearing action an aqueous slurry whose pH is no greater than 5 and consisting essentially of water, chrysotile asbestos and hydrogen smectite, the hydrogen smectite selected from the group consisting of hydrogen montmorillonite, hydrogen hectorite and mixtures of hydrogen montmorillonite and hydrogen hectorite;

the ratio by weight of the hydrogen smectite to the chrysotile asbestos being in the range of about 1–30 to about 30–1;

the ratio by weight of the water to the combined weights of the chrysotile asbestos and the hydrogen smectite being in the range of about 100–10 to about 100–1;

the shearing action continued at least until the mass is a colloidal suspension of the hydrogen smectite and asbestos, with ultimate particle size of at least 90 percent of the chrysotile asbestos therein having a lengthwise dimension no greater than 3 microns and a diameter no greater than 0.05 micron.

2. A method according to claim 1, the pH of the slurry being no greater than about 4.

3. A method according to claim 1, the pH of the slurry being no greater than about 3.

4. A method for preparing a colloidal asbestos suspension comprising:

subjecting to shearing action a slurry having a pH no greater than 5 and produced by combining components consisting essentially of water, chrysotile asbestos, smectite and sufficient acid;

the smectite selected from the group consisting of montmorillonite and/or hectorite;

the ratio by weight of the smectite to the chrysotile asbestos being in the range of about 1–30 to about 30–1;

the ratio by weight of the water to the combined weights of the chrysotile asbestos and the smectite being in the range of about 100–10 to about 100–1; the shearing action continued at least until the resulting mass is a colloidal suspension of hydrogen smectite and asbestos, with the ultimate particle size of at least 90 percent by weight of the chrysotile asbestos therein having a lengthwise dimension no greater than 3 microns and a diameter no greater than 0.05 micron.

5. A method according to claim 4, and recovering from the resulting mass a solid composition of matter whose moisture content is less than 15 percent by weight thereof and comprising the smectite and asbestos modified by the combined shearing action and pH conditions.

6. A method according to claim 5, the pH of the slurry being no greater than about 4.

7. A method according to claim 5, the pH of the slurry being no greater than about 3.

8. A method according to claim 5, the ratio by weight of the smectite to the chrysotile asbestos being in the range of about 1–10 to about 10–1.

9. A method according to claim 6, the ratio by weight of the smectite to the chrysotile asbestos being in the range of about 1–10 to about 10–1.

10. A method according to claim 7, the ratio by weight of the smectite to the chrysotile asbestos being in the range of about 1–10 to about 10–1.

11. A method according to claim 5, the ratio by weight of the smectite to the chrysotile asbestos being in the range of about 1–4 to about 4–1.

12. A method according to claim 6, the ratio by weight of the smectite to the chrysotile asbestos being in the range of about 1–4 to about 4–1.

13. A method according to claim 7, the ratio by weight of the smectite to the chrysotile asbestos being in the range of about 1–4 to about 4–1.

14. A suspension produced by the method defined in claim 1.

* * * * *